(12) United States Patent
Xu et al.

(10) Patent No.: US 7,740,066 B2
(45) Date of Patent: Jun. 22, 2010

(54) ADDITIVES FOR HIGH ALUMINA CEMENTS AND ASSOCIATED METHODS

(75) Inventors: Ying Xu, Ponca City, OK (US); B. Raghava Reddy, Duncan, OK (US); Rickey Lynn Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 223 days.

(21) Appl. No.: 12/020,410

(22) Filed: Jan. 25, 2008

(65) Prior Publication Data

US 2009/0188670 A1 Jul. 30, 2009

(51) Int. Cl.
*E21B 33/138* (2006.01)
*E21B 33/14* (2006.01)
*C04B 7/32* (2006.01)
*C09K 8/46* (2006.01)

(52) U.S. Cl. .................. 166/277; 106/692; 106/694; 106/819; 166/292; 175/72; 507/269; 507/277

(58) Field of Classification Search .................. None
See application file for complete search history.

(56) References Cited

U.S. PATENT DOCUMENTS

| | | | |
|---|---|---|---|
| 3,340,929 A | 9/1967 | Slagle | 166/29 |
| 3,581,825 A | 6/1971 | Messenger | |
| 3,844,351 A * | 10/1974 | Sutton et al. | 166/293 |
| 4,202,413 A | 5/1980 | Messenger | 166/292 |
| 4,304,298 A | 12/1981 | Sutton | 166/293 |
| 4,340,427 A | 7/1982 | Sutton | 106/87 |
| 4,350,533 A | 9/1982 | Galer et al. | 106/89 |
| 4,357,167 A | 11/1982 | Kellet et al. | |
| 4,367,093 A | 1/1983 | Burkhalter et al. | 106/87 |
| 4,450,010 A | 5/1984 | Burkhalter et al. | 106/87 |
| 4,565,578 A | 1/1986 | Sutton et al. | 106/87 |
| 5,123,487 A * | 6/1992 | Harris et al. | 166/277 |
| 5,127,473 A * | 7/1992 | Harris et al. | 166/277 |
| 5,135,577 A * | 8/1992 | Brothers | 106/724 |
| 5,226,961 A | 7/1993 | Nahm et al. | 106/692 |
| 5,346,012 A | 9/1994 | Heathman et al. | 166/293 |
| 5,431,730 A | 7/1995 | Fujimasu | |
| 5,512,096 A | 4/1996 | Krause | 106/718 |
| 5,588,488 A * | 12/1996 | Vijn et al. | 166/293 |
| 5,588,848 A | 12/1996 | Law et al. | 439/83 |
| 5,624,489 A | 4/1997 | Fu et al. | 106/692 |
| 5,900,053 A | 5/1999 | Brothers et al. | 106/678 |

(Continued)

FOREIGN PATENT DOCUMENTS

WO WO2008/177020 A1 10/2008

OTHER PUBLICATIONS

U.S. Appl. No. 11/691,395, filed Mar. 6, 2007, Reddy et al.

(Continued)

*Primary Examiner*—George Suchfield
(74) *Attorney, Agent, or Firm*—Craig W. Roddy; McDermott, Will & Emery, LLP

(57) ABSTRACT

The present invention includes methods and compositions that include a composition comprising a high alumina cement; a salt comprising at least one salt selected from the group consisting of an acidic salt, a neutral salt, and a low basicity salt; and a swellable clay; and methods of using that composition in subterranean formations.

20 Claims, 4 Drawing Sheets

U.S. PATENT DOCUMENTS

| | | | | |
|---|---|---|---|---|
| 5,913,364 | A | 6/1999 | Sweatman | 166/281 |
| 5,989,336 | A | 11/1999 | Carpenter et al. | 106/811 |
| 6,060,434 | A | 5/2000 | Sweatman et al. | 507/216 |
| 6,143,069 | A | 11/2000 | Brothers et al. | 106/678 |
| 6,145,591 | A | 11/2000 | Boncan et al. | 166/291 |
| 6,167,967 | B1 | 1/2001 | Sweatman | 166/281 |
| 6,230,804 | B1 | 5/2001 | Mueller et al. | 166/293 |
| 6,244,343 | B1 | 6/2001 | Brothers et al. | 166/293 |
| 6,258,757 | B1 | 7/2001 | Sweatman et al. | 507/219 |
| 6,279,655 | B1 | 8/2001 | Pafitis et al. | 166/294 |
| 6,332,921 | B1 | 12/2001 | Brothers et al. | 106/692 |
| 6,488,763 | B2 | 12/2002 | Brothers et al. | 106/692 |
| 6,561,273 | B2 | 5/2003 | Brothers et al. | 166/294 |
| 6,626,243 | B1 | 9/2003 | Boncan | 166/293 |
| 6,631,766 | B2 | 10/2003 | Brothers et al. | 166/293 |
| 6,722,434 | B2 | 4/2004 | Reddy et al. | 166/292 |
| 6,762,156 | B2 | 7/2004 | Heathman et al. | 507/211 |
| 6,796,378 | B2 | 9/2004 | Reddy et al. | 166/293 |
| 6,846,357 | B2 | 1/2005 | Reddy et al. | 106/692 |
| 7,229,492 | B2 | 2/2005 | Chatterji et al. | 106/724 |
| 6,904,791 | B2 | 6/2005 | Honma | 73/105 |
| 6,992,048 | B2 | 1/2006 | Reddy et al. | 507/202 |
| 7,036,586 | B2 | 5/2006 | Roddy et al. | 166/277 |
| 7,147,055 | B2 | 12/2006 | Brothers et al. | 166/293 |
| 7,147,067 | B2 | 12/2006 | Getzlaf et al. | 175/64 |
| 7,178,597 | B2 | 2/2007 | Reddy et al. | 166/293 |
| 7,182,137 | B2 | 2/2007 | Fyten et al. | 166/292 |
| 7,199,086 | B1 | 4/2007 | Roddy et al. | 507/269 |
| 7,204,310 | B1 | 4/2007 | Roddy et al. | 166/293 |
| 7,219,733 | B2 | 5/2007 | Luke et al. | 166/293 |
| 7,488,705 | B2 * | 2/2009 | Reddy et al. | 507/219 |
| 2004/0144537 | A1 | 7/2004 | Reddy et al. | 166/292 |
| 2004/0168802 | A1 | 9/2004 | Creel et al. | 166/293 |
| 2004/0171499 | A1 | 9/2004 | Ravi et al. | 507/200 |
| 2004/0221990 | A1 | 11/2004 | Heathman et al. | 166/292 |
| 2005/0034864 | A1 * | 2/2005 | Caveny et al. | 166/293 |
| 2005/0061206 | A1 | 3/2005 | Reddy et al. | 106/672 |
| 2005/0204960 | A1 | 9/2005 | Heathman et al. | 106/672 |
| 2006/0054321 | A1 * | 3/2006 | Szymanski et al. | 166/293 |
| 2006/0084580 | A1 | 4/2006 | Santra et al. | 507/239 |
| 2006/0086502 | A1 | 4/2006 | Reddy et al. | 166/291 |
| 2006/0086503 | A1 | 4/2006 | Reddy et al. | 166/293 |
| 2006/0175060 | A1 | 8/2006 | Reddy | 166/294 |
| 2006/0272819 | A1 * | 12/2006 | Santra et al. | 166/292 |
| 2007/0062691 | A1 | 3/2007 | Reddy et al. | 166/250.01 |
| 2007/0102157 | A1 | 5/2007 | Reddy et al. | 166/291 |
| 2007/0227404 | A1 | 10/2007 | Plank et al. | |
| 2008/0236826 | A1 * | 10/2008 | Reddy et al. | 166/292 |

OTHER PUBLICATIONS

U.S. Appl. No. 11/669,069, filed Jan. 30, 2007, Reddy et al.
API Recommended Practice 10B-5, First Edition, Apr. 2005.
"Recommended Practice of Determination of Shrinkage and Expansion of Well Cement Formulations at Atmospheric Pressure," ANSI/API Recommended Practice 10B-2, First Edition, Jul. 2005.
Product Data Sheet, "Microbond™," Halliburton Fluid Systems, 2006.
Product Data Sheet, "Microbond-M™," Halliburton Fluid Systems, 2006.
Product Data Sheet, "Microbond-HT™," Halliburton Fluid Systems, 2006.
Product Data Sheet, "Super CBL™ Additive," Halliburton Fluid Systems, 2006.
Product Data Sheet, "ThermaLock™ Cement," Halliburton Fluid Systems, 2006.
Product Data Sheet, "MicroBond HT™ Cement Additive" Halliburton Fluid Systems, 2006.
Product Data Sheet, "MicroBond M™ Cement Additive," Halliburton Fluid Systems, 2006.
Pollard, et al., "New Cement Additive Improves Slurry Properties and Saves Cost," SPE 28773, 1994.
International Search Report and Written Opinion for PCT/GB2009/000035, dated Apr. 23, 2009.

* cited by examiner

ADDITIVES FOR HIGH ALUMINA CEMENTS AND ASSOCIATED METHODS

BACKGROUND

The present invention relates to cement compositions and associated methods. More specifically, the present invention relates to cement compositions that comprise a high alumina cement, a swellable clay, and an acidic, neutral, or low basicity salt, and associated methods.

Cement compositions may be used in a variety of subterranean applications. An example of a subterranean application that utilizes cement compositions may be primary cementing whereby pipe strings, such as casing and liners, can be cemented in well bores. In performing primary cementing, a cement composition may be pumped into an annular space between the walls of a well bore and the exterior surface of a pipe string disposed therein. The cement composition can be set in the annular space, thereby forming an annular sheath of hardened cement (i.e., a cement sheath) that may support and position the pipe string in the well bore and may bond the exterior surface of the pipe string to the walls of the well bore. Cement compositions also may be used in remedial cementing operations, for example, to seal cracks or holes in pipe strings, to seal highly permeable zones or fractures in subterranean formations, and the like. Cement compositions also may be used in surface applications, for example, construction cementing.

Heretofore, cement compositions used in subterranean applications have commonly comprised Portland cement. Drawbacks may exist to using Portland cement in certain applications, however, because Portland cement may be prone to corrosive attack by carbonic acid. Other hydraulic cements also may be prone to corrosive attacks by carbonic acid. Carbonic acid may be naturally present in a subterranean formation, or it may be produced in the formation by the reaction of water and carbon dioxide when the latter is introduced into the formation, for example, during a carbon dioxide enhanced recovery operation. Carbonic acid is believed to react with calcium hydroxide that is produced by hydration of Portland cement potentially causing the deterioration of the set cement. This may be problematic, for example, because it may increase the permeability of the set cement. In some instances, the degradation of the set cement may cause loss of support for the pipe string and undesirable interzonal communication of fluids.

The susceptibility of some hydraulic cements (e.g., Portland cement), to degradation by carbonic acid may be especially problematic in high temperature wells (e.g., geothermal wells, steams injection wells, and/or steam production wells). The term "high temperature," as used herein, refers to wells having a static bottom hole temperature above about 200° F. Because the high static well bore temperatures involved are often coupled with brines containing carbon dioxide, these hydraulic cements may rapidly deteriorate. In geothermal wells, which typically involve high temperatures and pressures, and may contain carbon dioxide, set cement failures have occurred in less then five years causing the collapse of well casing. High aluminate cements, for example calcium aluminate cements which are refractory materials, offer cement compositions more suitable for cementing high temperature subterranean wells than Portland cements.

It has heretofore been discovered that in some instances cement compositions comprising water, high alumina cement, and a soluble phosphate may set to form a cement that is thought to exhibit improved failure resistance when cured in hydrothermal environments as compared to previously used cement compositions comprising Portland cement. As used herein, the term "high alumina cement" refers to cement having an alumina concentration, typically present as calcium aluminate, in the range of from about 35% to about 80% by weight of the high alumina cement.

Although high alumina cements may have many desirable properties, a potentially significant drawback to their use may be their tendency to shrink in volume once placed in a subterranean formation. This shrinkage may be of particular concern in geothermal wells and steam injection wells in which cement shrinkage in the annular space between a well bore wall and the exterior surface of a pipe string can create a microannulus in the annular space. If steam enters the microannulus, pressure may build up behind the pipe string, which might in turn damage the pipe string. Additionally, microannulus formation due to cement shrinkage may result in loss of zonal isolation. To counteract a similar shrinkage problem that has been recognized with Portland cements, expansive additives have been added to Portland cement compositions. Examples of expansive additives that have been used with Portland cement include gypsum and calcium aluminate at low temperatures and gypsum and magnesium oxides at high temperatures, and combinations thereof. The expansive additives that have traditionally been used with Portland cements may not be sufficiently effective when used with high alumina cements.

SUMMARY

The present invention relates to cement compositions and associated methods. More specifically, the present invention relates to cement compositions that comprise a high alumina cement, a swellable clay, and an acidic, neutral, or low basicity salt, and associated methods.

One embodiment of the present invention provides a composition comprising a high alumina cement; a salt comprising at least one salt selected from the group consisting of an acidic salt, a neutral salt, and a low basicity salt; and a swellable clay.

Another embodiment of the present invention describes a method comprising providing a high alumina cement, a swellable clay, at least one salt selected from the group consisting of: an acidic salt, a neutral salt, and a low basicity salt, and water in an amount sufficient to form a pumpable slurry; and combining the high alumina cement, the swellable clay, the water, and the salt to form a pumpable slurry.

Another embodiment of the present invention describes a method comprising providing a cement composition that comprises a high alumina cement, a salt comprising at least one salt selected from the group consisting of: an acidic salt, a neutral salt, and a low basicity salt, a swellable clay, and water in an amount sufficient to form a pumpable slurry, and introducing the cement composition into a well bore that penetrates a subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
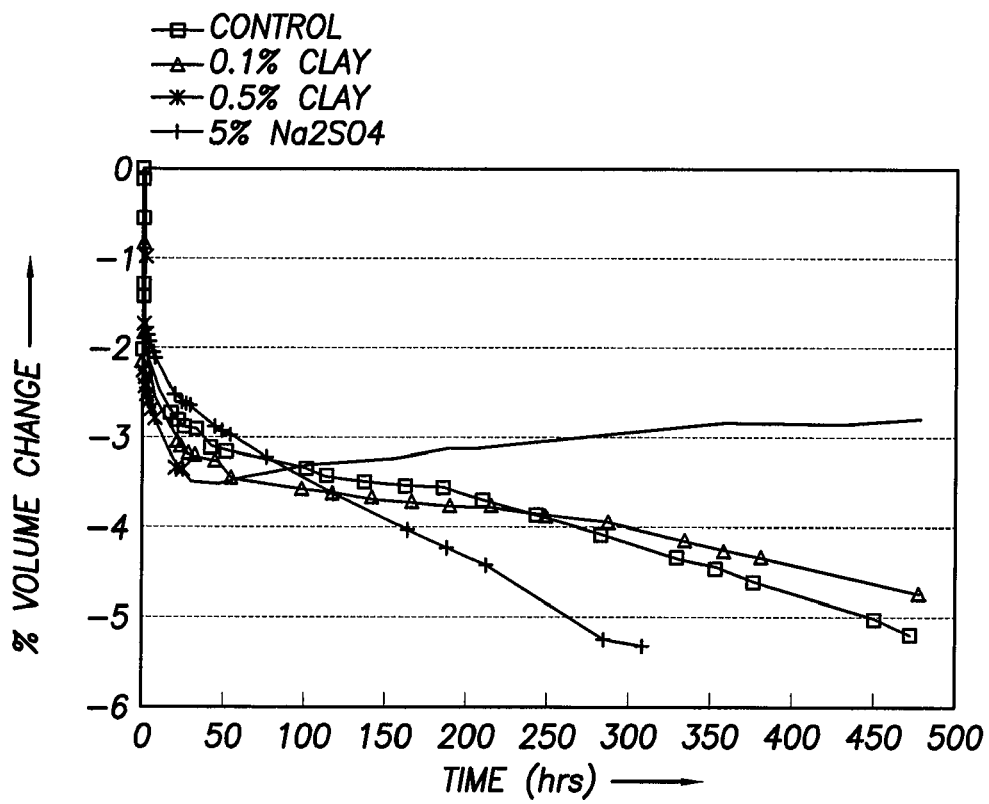
FIG. 1 illustrates the results of cement shrinkage tests performed on a variety of cement compositions.

The present invention relates to cement compositions and associated methods. More specifically, the present invention relates to cement compositions that comprise a high alumina cement, a swellable clay, and an acidic, neutral, or low basicity salt, and associated methods.

There may be several potential advantages to the methods and compositions of the present invention, some of which are alluded to herein. Of the many potential advantages, one such advantage may be that the cement compositions of the present invention may have a favorable shrinkage profile when compared to some previously known high alumina cement compositions. For example, the cement compositions of the present invention may not reduce in volume as much as known high alumina cements during setting and/or when set. Another advantage of the cement compositions of the present invention may be that the cement compositions may actually expand during setting and/or when set. Furthermore, it is believed that certain embodiments of the present invention may be useful in cementing operations in which resistance to carbon dioxide is desired, for example, in high temperature well bores.

In some embodiments, the present invention provides methods comprising providing a high alumina cement, a swellable clay, at least one salt selected from the group consisting of: an acidic salt, a neutral salt, and a low basicity salt, and water in an amount sufficient to form a pumpable slurry; and combining the high alumina cement, the swellable clay, the water, and the salt to form a pumpable slurry.

In general, a high alumina cement present in the cement compositions of the current invention may be any cement having an alumina concentration in the range of from about 35% to about 80% by weight of the high alumina cement. In some embodiments, a high alumina cement may be a calcium aluminate cement ("CAC"). In some embodiments, a CAC may comprise calcium, aluminum, and oxygen, and may set and harden by reaction with water. According to some embodiments, a high alumina cement may be present in the cement compositions of the present invention in an amount in the range of from about 20% to about 80% by weight of the cement composition. In some embodiments, the high alumina cement may be present in a cement composition in an amount in the range of from about 30% to about 70% by weight of the cement composition.

In some embodiments, a cement composition of the present invention may comprise a high alumina cement which, when mixed in an aqueous fluid, may have a pH in the range of from about 3 to about 10. Additionally, the high alumina cement in the cement compositions of the present invention may have an aluminum oxide ($Al_2O_3$, also referred to as alumina) to calcium oxide (CaO) weight ratio that varies from about 0.5:1 to about 5:1, alternatively from about 1:1 to about 4:1. Examples of suitable high alumina cement materials include, without limitation, SECAR® 80, SECAR® 60, SECAR® 51, SECAR® 41, and SECAR® 71 which are high alumina cements commercially available from Lafarge Aluminates, Chesapeake, Va.; CA-14, CA-270, and CA-25 grade high alumina cements commercially available from Almatis, Inc., Leetsdale, Pa.; and THERMALOCK™ cement which is a blend of a high alumina cement comprising calcium aluminate, a phosphate salt, and flyash and which is commercially available from Halliburton Energy Services, Inc. of Duncan Okla. Cement compositions comprising high alumina cements which may be suitable for use in the current invention are described in, inter alia, U.S. Pat. No. 6,332,921, the relevant disclosure of which is hereby incorporated herein by reference.

In some embodiments of the present invention, the high alumina cement may have a low alumina content and/or a high iron oxide content. Such cements may further comprise small amounts of silica. As used herein, a low alumina content in high alumina cement refers to an alumina cement having equal to or less than about 50% aluminum oxide by weight of the high alumina cement, alternatively equal to or less than about 40% alumina by weight of the high alumina cement, or alternatively equal to less than about 37% alumina by weight of the high alumina cement. As used herein, a high iron oxide content high alumina cement refers to a cement having equal to or greater than about 2% Fe as iron oxide by weight of the high alumina cement, alternatively equal to or greater than about 10% Fe as iron oxide by weight of the high alumina cement, or alternatively equal to or greater than about 20% Fe as iron oxide by weight of the high alumina cement. When silica is present, it may be present in an amount from about 0.1% to about 10% by weight of the high alumina cement. Examples of high alumina cements having low aluminum oxide content and/or high iron content include, without limitation, SECAR® 41 and CIMENT FONDU® which are calcium aluminate hydraulic cements commercially available from Lafarge Aluminates, Chesapeake, Va.

The cement compositions of the present invention may comprise an acidic, neutral, or low basicity salt in an amount in the range of from about 0.5% to about 10% by weight of the high alumina cement, alternatively from about 3% to about 7% by weight of the high alumina cement. In general, acidic, neutral, or low basicity salts which are suitable for use in the cement compositions of the present invention may include any acidic, neutral, or low basicity salt that does not adversely interact with another component of the cement composition or other substance that contacts the cement composition. Low basicity salts are defined as those which provide a pH of about 10 or less when dissolved in water, for example at about 1% concentration. For example, in some embodiments, an acidic, neutral, or low basicity salt may be a water soluble inorganic salt such as sodium sulfate, potassium sulfate, ammonium sulfate, sodium chloride, potassium chloride, ammonium salt, a nitrate salt of an alkali metal, an ammonium ion, or a higher valence metal, and a dibasic or monobasic salt of a metal ion. Organic salts, for example such as sodium laurel sulfate, may also be suitable if the pH of aqueous solutions of such salts does not exceed about 10. Basic salts such as carbonates, bicarbonates, and hydroxides may not be suitable. When higher valence metals are present in the salt, they may act to retard the setting of the cement. In such cases, combinations of salts of high valence and monovalent metals may be used. Such combinations are described in pending U.S. patent application Ser. No. 11/691,395, filed Mar. 26, 2007, and pending U.S. patent application Ser. No. 11/669,060, filed Jan. 30, 2007, each of which is incorporated by reference herein in its entirety.

The swellable clay present in the cement compositions of the present invention may be any clay that increases in volume when exposed to water. Preferably, such clays belong to a class of clays referred to as smectite clays. Some non-limiting examples of smectite clays include beidellite, montmorillonite, bentonite, nontronite, and saponite, and derivatives thereof. Some swellable clays that are suitable for use in the present invention may comprise platelet-like components that expand and/or separate upon exposure to water, thereby increasing the volume of the swellable clay. In some embodiments, the swellable clay may be present in a cement composition of the current invention in an amount in the range of from about 0.1% to about 10% by weight of the high alumina cement in the cement composition, alternatively from about 3% to about 5% by weight of the high alumina cement.

In some embodiments, the cement composition may include a sufficient amount of water to form a pumpable slurry. The water may be fresh or salt water, e.g., an unsaturated aqueous salt solution or a saturated aqueous salt solutions such as brine or seawater. The water may be present in an amount from about 20% to about 180% percent by weight of the dry alumina cement, alternatively from about 28% to about 60% by weight of the dry high alumina cement. The amount of water may depend on the desired density of the cement slurry and the desired slurry rheology, and as such may be determined by one of ordinary skill in the art with the benefit of this disclosure.

According to certain embodiments in which the cement compositions of the present invention comprise water in an amount sufficient to create a slurry, the cement compositions may not undergo a reduction in volume during setting and/or may expand during setting. In some embodiments, at atmospheric pressure a slurry of the of the present invention may increase in volume from about 10% to about 20% over the initial volume of the cement composition during setting. Without wishing to be limited by theory, it is believed that when only one of the swellable clay or the acidic, neutral or low basicity salt is present in a high alumina cement, the shrinkage profile is not substantially improved compared with an embodiment in which both the swellable clay and the acidic, neutral, or low basicity salt are present. Furthermore, by way of explanation and not of limitation, it is believed that while the final volume of the cement composition may depend on the amount of swellable clay present in the cement composition, the rate of the increase in volume and/or the time at which expansion begins may be regulated by varying the amount of the acidic, neutral, or low basicity salt.

In some embodiments, certain additives may also be included in the cement composition. Examples of such additives include but are not limited to retarders, viscosifiers, settling prevention materials, accelerators, defoamers, foaming surfactants, fluid loss agents, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers, carbon fibers, glass fibers, metal fibers, mineral fibers, and the like can be added to further modify the mechanical properties. These additives may be included singularly or in combination. Methods for introducing these additives and their effective amounts are known to one of ordinary skill in the art. In some embodiments the compositions are described in U.S. Pat. Nos. 6,332,921, 5,900,053, and 6,143,069, each of which is incorporated by reference herein in its entirety.

In some embodiments of the present invention, the cement composition may further comprise a polymeric phosphate salt. The polymeric phosphate salts are generally represented as $(NaPO_3)_n$, where n represents the degree of polymerization of the phosphate unit. The degree of polymerization may range from about 3 to about 30, alternatively from about 10 to about 25. The polyphosphate salts may comprise polymeric phosphate salts of alkali metal salts such as for example and without limitation sodium(hexa)metaphosphate and sodium tripolyphosphate. The amount of polyphosphate salt in the cement composition may range from about 2% by weight to about 20% by weight, alternatively from about 5% by weight to about 15% by weight, or alternatively from about 8% by weight to about 12% by weight, based upon the total weight of the high alumina cement in the cement composition.

In some embodiments, the high alumina cement may further comprise a filler such as, for example and without limitation, ASTM Class F flyash. Without wishing to be limited by theory, some potential problems associated with premature gelation of a high alumina cement may be exacerbated by the type and source of components present in commercially available high alumina cements. For example, the composition of a filler present in a commercially available high alumina cement or added to a high alumina cement may vary depending on the supplier of the filler. Likewise, variations in the composition of the filler (e.g., Class F flyash) may adversely affect the thickening time of a high alumina cement. The amount of filler which may be present in the high alumina cement may range from about 25% to about 150% by weight of the high alumina cement, alternatively from about 50% to about 125% by weight of the high alumina cement, or alternatively from about 75% to about 100% by weight of the high alumina cement. High alumina cement compositions comprising calcium aluminate, phosphate salts and filler are described in the above-referenced U.S. Pat. Nos. 5,900,053, 6,143,069, and 6,332,921.

In some embodiments, a cement composition of the present invention may comprise a gelation inhibitor (GI). The GI may comprise a copolymer obtained by the copolymerization of at least one sulfonated monomer, at least one carboxylated monomer, and at least one nonionic monomer. Alternatively, the GI may comprise a copolymer obtained by the copolymerization of at least two sulfonated monomers, at least one carboxylated monomers, and at least one nonionic monomer.

In some embodiments, the cement composition may comprise a set modifier. Set modifiers are materials such as set retarders and set accelerators which function to alter the time required for the composition to undergo the phase transition from a liquid slurry to a set solid mass. Such materials may allow the operator to control the set time of the composition based on a variety of factors such as, for example, the well bore temperature at which the cement composition will be used. In an embodiment, a set modifier suitable for use with a cement composition of this invention comprises an organic acid such as citric and tartaric acids, or a polyvalent cation-containing compound. The polyvalent cation-containing compound may function to increase the thickening time of the high alumina cement and as such act as a set retarder. In an embodiment, the polyvalent cation-containing compound comprises a salt containing a polyvalent cationic metal. Such salts are known to one of ordinary skill in the art and include for example and without limitation alkaline earth metal salts such as magnesium chloride, calcium nitrate, calcium chloride, transition metal salts such as titanium (IV) sulfate, titanium (IV) tartarate, zirconium (IV) chloride, zirconium (IV) oxychloride, zirconium (IV) acetate, zirconium (IV) citrate, zirconium (IV) lactate, cobalt (II or III) chloride, and nickel (II) chloride. Examples of polyvalent metal salts suitable for use in this disclosure include without limitation calcium chloride and CL-23™ cross linker, which is commercially available from Halliburton Energy Services. In an embodiment, the set modifier may be included in the cement composition in amount ranging from about 0.1% to about 10% by weight of the calcium aluminate content of the high alumina cement, alternatively from about 0.3% to about 5.0% by weight of the calcium aluminate content of the high alumina cement, alternatively from about 0.4% to about 2.0% by weight of the calcium aluminate content of the high alumina cement.

In some embodiments, the polyvalent cation-containing compound may be used in combination with at least one other set modifier. The set modifier may comprise conventional set accelerators and set retarders which may be combined with the polyvalent cation-containing compound to provide a desired set time for a high alumina cement. Such compositions comprising at least one polyvalent cation-containing compound with conventional set retarders and/or accelerators are referred to herein as set modifier compositions (SMC). In an embodiment, a SMC comprises a monovalent cation-containing compound and a polyvalent cation-containing compound. In an embodiment, the monovalent cation-containing compound comprises a monovalent metal salt. Monovalent metal salts may act as set accelerators for high alumina cements and/or Portland cements. Examples of monovalent metal salts suitable for use in the SMC include, without limitation, alkali metal salts such as the soluble salts of sodium, potassium, and lithium. In an alternative embodiment, the SMC comprises a polyvalent cation-containing compound and an organic acid. Organic acids may act as set retarders that function to delay gelation of the cement composition. Various organic acids can be included in the SMC including, but not limited to, tartaric acid, citric acid, oxalic acid, gluconic acid, oleic acid, and uric acid. Examples of suitable organic acids are commercially available from Halliburton Energy Services, Inc. of Duncan Okla. under the trade names HR®-25 and Fe-2®. The ratio of polyvalent cation-containing compound to monovalent cation-containing compound or polyvalent cation-containing compound to organic acid in the SMC will depend on factors such as the desired set time and operating temperature and may be determined by one of ordinary skill in the art to meet the needs of the user.

The components of the cement composition as described herein may be combined in any order desired by the user to form a slurry. In some embodiments, the slurry may then be placed into a well bore. The components of the cement composition may be combined using any mixing device compatible with the composition, for example a bulk mixer or a recirculating mixer. The components of the cement composition may also be mixed by any other sufficient means, e.g., by introducing the components of the cement composition into a well bore via separate conduits such that the components are allowed to mix within the well bore In some embodiments, a cement composition of the present invention may set into a hard mass soon after setting, for example within about 10 hours to about 48 hours after setting, with compressive strengths of from about 250 psi to about 20,000 psi, alternatively from about 500 psi to about 5,000 psi, alternatively from about 1,000 psi to about 3,000 psi. As used herein, compressive strength is defined as the capacity of a material to withstand axially directed pushing forces. The maximum resistance of a material to an axial force is determined in accordance with American Petroleum Institute (API) Recommended Practice 10B-2, First Edition, July 2005. Beyond the limit of the compressive strength, the material becomes irreversibly deformed and no longer provides structural support and/or zonal isolation.

The cement compositions disclosed herein can be used for any purpose. In some embodiments, the cement compositions disclosed herein can be used to service a well bore that penetrates a subterranean formation. It is to be understood that "subterranean formation" encompasses both areas below exposed earth and areas below earth covered by water such as ocean or fresh water. Servicing a well bore includes, without limitation, positioning the cement composition in the well bore to isolate the subterranean formation from a portion of the well bore; to support a conduit in the well bore; to plug a void or crack in the conduit; to plug a void or crack in a cement sheath disposed in an annulus of the well bore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of a cement slurry in cementing operations; and to seal an annulus between the well bore and an expandable pipe or pipe string. For instance, the cement composition may viscosify in a loss-circulation zone and thereby restore circulation. The viscosified mixture can set into a flexible, resilient, and tough material, which may prevent further fluid losses when circulation is resumed. The cement composition may withstand substantial amounts of pressure, e.g., the hydrostatic pressure of a drilling fluid or cement slurry, without being dislodged or extruded. The cement composition may provide a relatively viscous mass inside the loss-circulation zone. The cement composition may also form a non-flowing, intact mass inside the loss-circulation zone. This mass plugs the zone and inhibits loss of subsequently pumped drilling fluid, which allows for further drilling. Methods for introducing compositions into a well bore to seal subterranean zones are described in U.S. Pat. Nos. 5,913,364, 6,167,967, and 6,258,757, each of which is incorporated by reference herein in its entirety.

In an embodiment, the cement composition may be employed in well completion operations such as primary and secondary cementing operations. Said compositions may be placed into an annulus of the well bore and allowed to set such that it isolates the subterranean formation from a different portion of the well bore. The cement compositions thus form a barrier that prevents fluids in that subterranean formation from migrating into other subterranean formations. In some embodiments, the annulus may be the annular space between the well bore wall and a pipe string, e.g. a casing, disposed in the well bore. Thus, in some embodiments, the cement composition also serves to support a pipe string, e.g., casing, in the well bore.

In some embodiments, the well bore in which the cement compositions are positioned belongs to a multilateral well bore configuration. It is to be understood that a multilateral well bore configuration includes at least two principal well bores connected by one or more ancillary well bores. In secondary cementing, often referred to as squeeze cementing, the cement composition may be strategically positioned in the well bore to plug a void or crack in a larger structure that is disposed in the well bore. For example, the cement composition may be positioned so as to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a cement composition are described in U.S. Pat. Nos. 5,346,012 and 5,588,848, which are incorporated by reference herein in their entirety.

To facilitate a better understanding of the present invention, the following examples of certain aspects of some embodiments are given. In no way should the following examples be read to limit, or define, the entire scope of the invention.

EXAMPLES

Example 1

Four cement compositions of 15.01 pounds per gallon density were prepared comprising a THERMALOCK™ blend and varying amounts of bentonite clay and sodium sulfate ($Na_2SO_4$), as described in Table 1 below, with appropriate amounts of water adjusted to obtain a slurry having the desired density (about 41% by weight of the cement). In all of the Examples and Tables that follow, the amounts of the different components of the cement compositions are given as weight percentages based on the dry weight of the THERMALOCK™ blend.

TABLE 1

| Sample No. | Bentonite Clay | Sodium Sulfate |
| --- | --- | --- |
| 1 | 0.0% | 0.0% |
| 2 | 0.1% | 0.0% |
| 3 | 0.5% | 0.0% |
| 4 | 0.0% | 5.0% |

Shrinkage tests were conducted on each of the four cement samples, using the buoyancy method, an API approved method for measuring cement shrinkage under water-free conditions at atmospheric pressure and temperature. Volume changes under pressure were measured at room temperature using the ring mold method, another API approved method. The results of these tests are illustrated in FIG. 1. The procedures that were followed are generally described in "Recommended Practice on Determination of Shrinkage and Expansion of Well Cement Formulations at Atmospheric Pressure," ANSI/API Recommended Practice 10B-5, First Edition, April 2005. As can be seen from FIG. 1, the addition of bentonite clay by itself to the THERMALOCK™ blend may either increase shrinkage or cause limited expansion depending on the amount of bentonite clay added. The addition of sodium sulfate by itself to the THERMALOCK™ blend also did not result in volume expansion.

Example 2

Four cement samples of 15.01 pounds per gallon density were prepared comprising a THERMALOCK™ blend and varying amounts of bentonite clay and sodium sulfate, as described in Table 2 below, with appropriate amounts of water adjusted to obtain a slurry having the desired density.

TABLE 2

| Sample No. | Bentonite Clay | Sodium Sulfate |
| --- | --- | --- |
| 5 | 0.0% | 0.0% |
| 6 | 0.5% | 5.0% |
| 7 | 0.3% | 5.0% |
| 8 | 0.0% | 5.0% |

Figure 2:
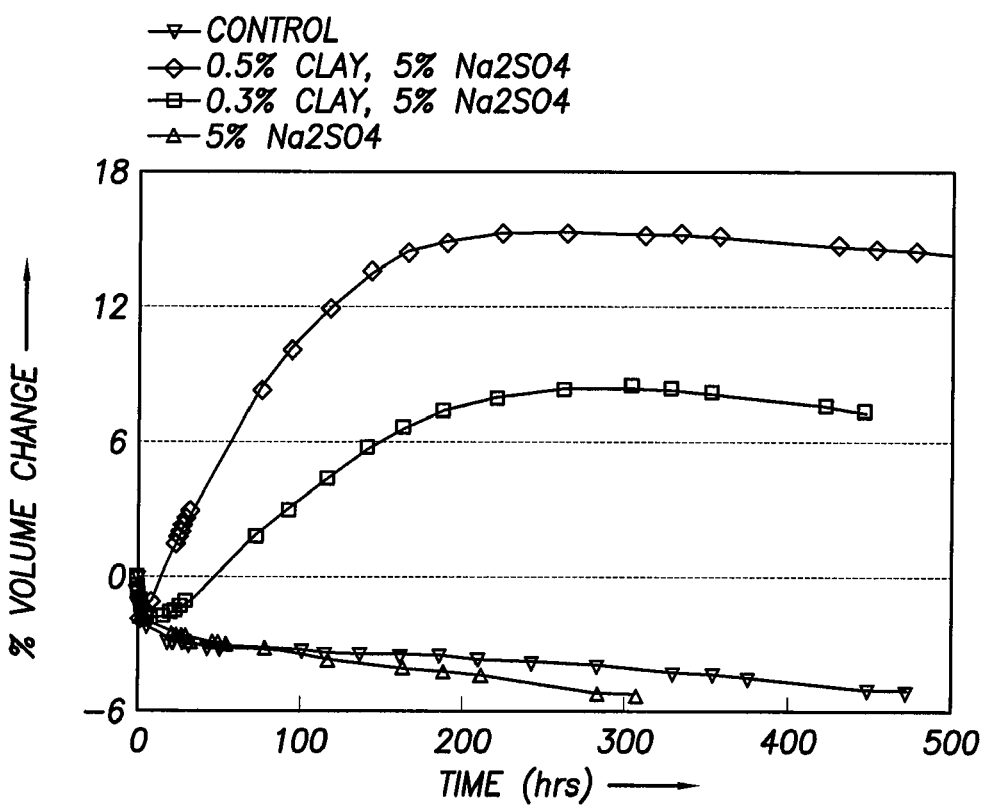
FIG. 2 illustrates the results of cement shrinkage tests performed on a variety of cement compositions, including an embodiment of a cement composition of the present invention.

Shrinkage tests, as described in Example 1, were conducted on each of the cement samples. The results of these tests are shown in FIG. 2. The results in FIG. 2 illustrate that the addition of a combination of bentonite clay and sodium sulfate to the THERMALOCK™ blend may cause expansion of the cement composition over time and that the expansion may depend on the amount of bentonite and the ratio of sodium sulfate to bentonite. At least one sample tested in this example demonstrated up to 15% expansion by volume.

Example 3

Four cement samples were prepared comprising a THERMALOCK™ blend and varying amounts of bentonite clay and sodium sulfate, as described in Table 3 below, with appropriate amounts of water adjusted to obtain a slurry having the desired density.

TABLE 3

| Sample No. | Bentonite Clay | Sodium Sulfate |
| --- | --- | --- |
| 9 | 0.0% | 0.0% |
| 10 | 0.5% | 5.0% |
| 11 | 0.5% | 1.0% |
| 12 | 0.5% | 0.0% |

Figure 3:
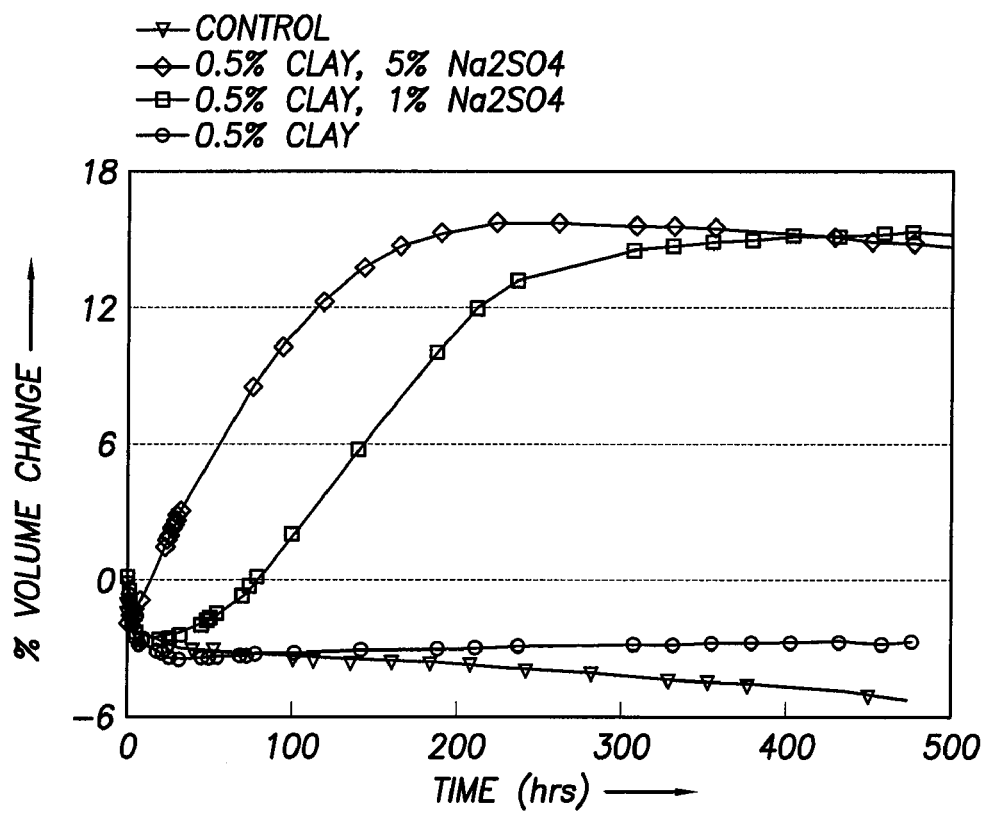
FIG. 3 illustrates the results of cement shrinkage tests performed on a variety of cement compositions, including an embodiment of a cement composition of the present invention.

The shrinkage tests described in Example 1 were conducted on each of the cement samples. The results of these tests are illustrated in FIG. 3. The results in FIG. 3 illustrate that while bentonite may control the total volume expansion, the amount of sodium sulfate may control the rate of expansion. For example, the sample comprising 5% sodium sulfate began expanding much earlier than a similar sample that comprised 1% sodium sulfate. Thus, one might be able to control the rate of expansion by regulating the amount of sulfate salt present in the cement composition.

Example 4

Three cement samples were prepared comprising a THERMALOCK™ blend, bentonite clay, water, and a different sulfate salt, as described in Table 4 below. A control sample, Sample 13, was also prepared comprising only THERMALOCK™ blend.

TABLE 4

| Sample No. | Bentonite Clay | Sodium Sulfate | Potassium Sulfate | Ammonia Sulfate |
| --- | --- | --- | --- | --- |
| 13 | 0.0% | 0.0% | 0.0% | 0.0% |
| 14 | 0.3% | 1.0% | 0.0% | 0.0% |
| 15 | 0.3% | 0.0% | 1.0% | 0.0% |
| 16 | 0.3% | 0.0% | 0.0% | 1.0% |

Figure 4:
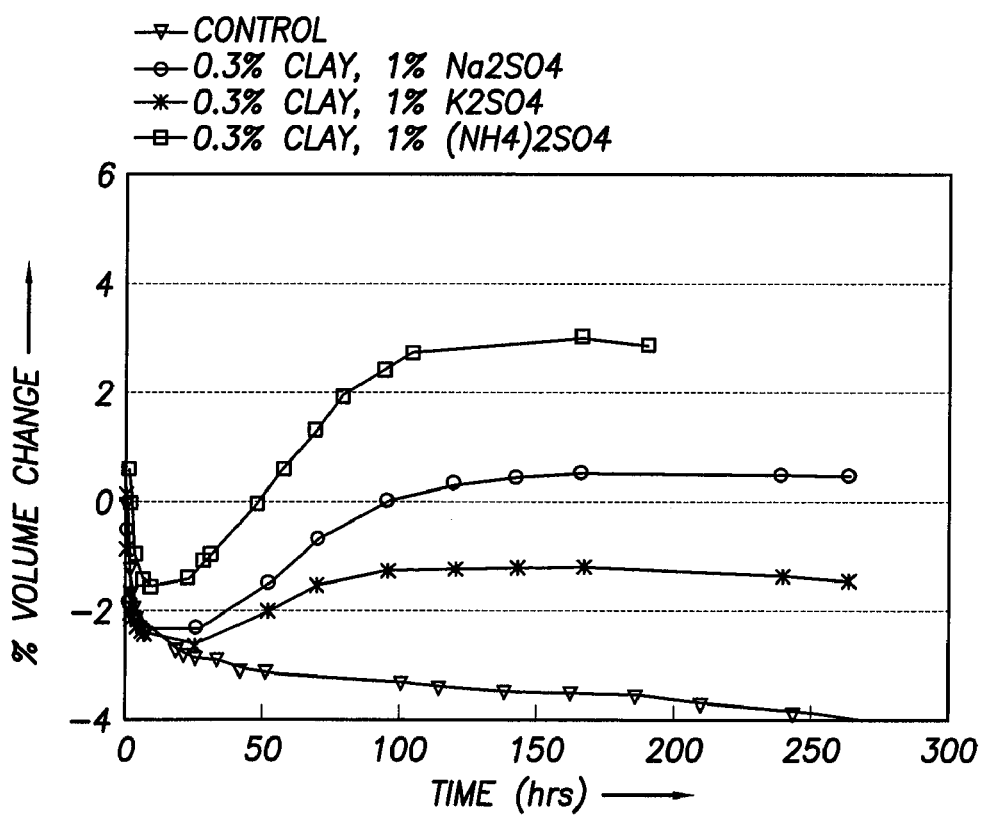
FIG. 4 illustrates the results of cement shrinkage tests performed on a variety of cement compositions, including an embodiment of a cement composition of the present invention.

Shrinkage tests, as described in Example 1, were conducted on each of the cement samples. The results of these tests are illustrated in FIG. 4. The results in FIG. 4 illustrate that sulfate salts other than sodium sulfate, such as potassium sulfate, may also cause expansion when used in combination with bentonite. This indicates that the cationic portion of the salt may not be critical to expansion of a high alumina cement composition. Similar results were also obtained for ammonium sulfate. Whereas aqueous solutions of sodium and potassium sulfate salts are neutral (pH around 7), an aqueous solution of ammonium sulfate is slightly acidic (a 0.1 Molar solution has a pH of about 5.5).

Example 5

Three cement samples were prepared comprising a THERMALOCK™ blend, water, and varying amounts of bentonite clay and sodium salts, as shown in Table 5 below. A control sample, Sample 13, was also prepared comprising only THERMALOCK™ blend.

TABLE 5

| Sample No. | Bentonite Clay | Sodium Sulfate | Sodium Chloride |
|---|---|---|---|
| 17 | 0.0% | 0.0% | 0.0% |
| 18 | 0.5% | 5.0% | 0.0% |
| 19 | 0.5% | 0.0% | 5.0% |

Figure 5:
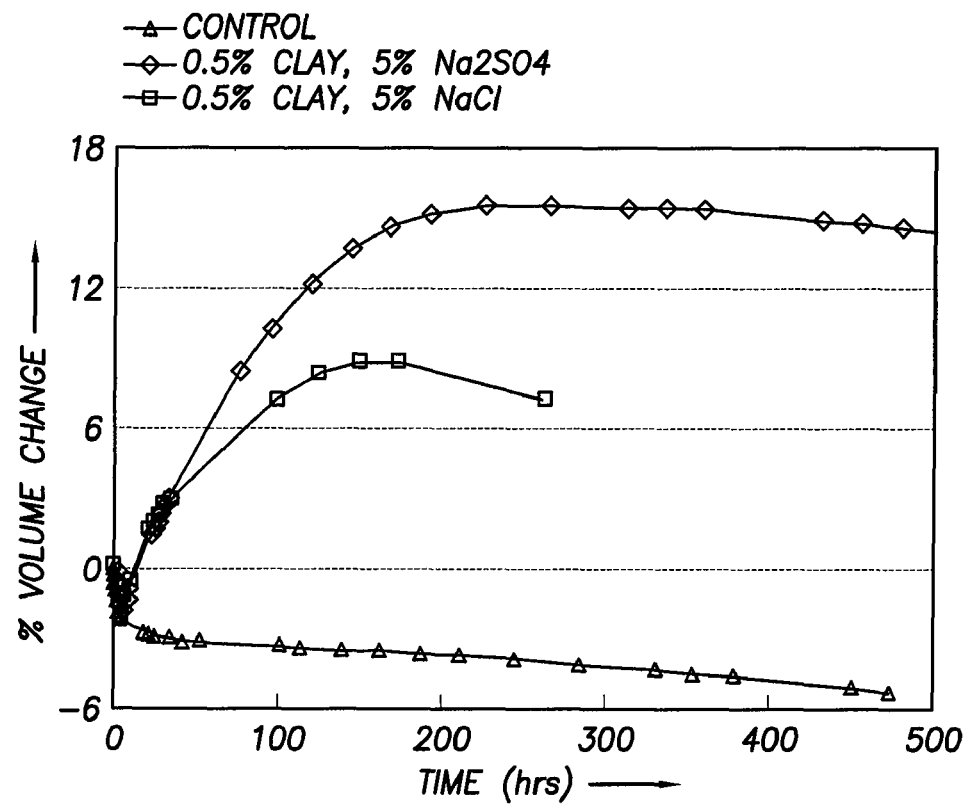
FIG. 5 illustrates the results of cement shrinkage tests performed on a variety of cement compositions, including an embodiment of a cement composition of the present invention.

Shrinkage tests, as described in Example 1, were conducted on each of the cement samples. The results of these tests are illustrated in FIG. 5. The results in FIG. 5 illustrate that other salts of similar pH, irrespective of the ionic composition may also cause expansion.

Example 6

In order to confirm that the observed high levels of expansion are not due to a gas formation, gas-generating salts, namely sodium carbonate and sodium bicarbonate which typically produce gas under low pH conditions such as in aqueous calcium aluminate slurries, were added to the blend. Three cement samples were prepared comprising a THERMALOCK™ blend, water, and varying amounts of gas-generating salts, as shown in Table 6 below. Sample 20, the control sample, comprised a THERMALOCK™ blend and no gas-generating salt.

TABLE 6

| Sample No. | Sodium Carbonate | Sodium Bicarbonate |
|---|---|---|
| 20 | 0% | 0% |
| 21 | 0.5% | 0% |
| 22 | 5% | 0% |
| 23 | 0% | 5% |

Figure 6:
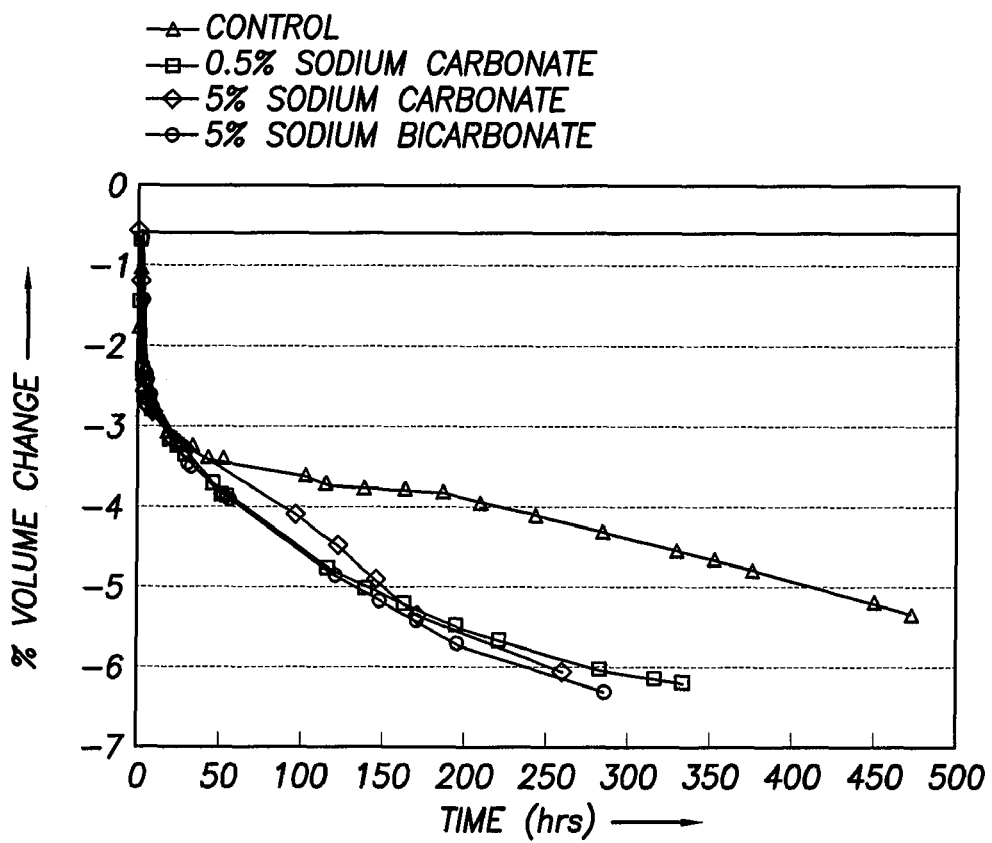
FIG. 6 illustrates the results of cement shrinkage tests performed on a variety of cement compositions.

Shrinkage tests, as described in Example 1, were conducted on each of the cement samples. The results of these tests are illustrated in FIG. 6. The results in FIG. 6 illustrate that the volume expansion caused by a bentonite and salt combination may not be due to gas generation.

Example 7

Two cement samples were prepared comprising a THERMALOCK™ blend, water, and varying amounts of bentonite clay and sodium sulfate, as shown in Table 7 below. Sample 24, the control sample, comprised a THERMALOCK™ blend, no bentonite clay, and no sulfate salt. Sample 25 comprised a THERMALOCK™ blend, 0.5% bentonite clay by weight of the THERMALOCK™ blend, and 5.0% sodium sulfate by weight of the THERMALOCK™ blend.

TABLE 7

| Sample No. | Bentonite Clay | Sodium Sulfate |
|---|---|---|
| 24 | 0.0% | 0.0% |
| 25 | 0.5% | 5.0% |

Figure 7:
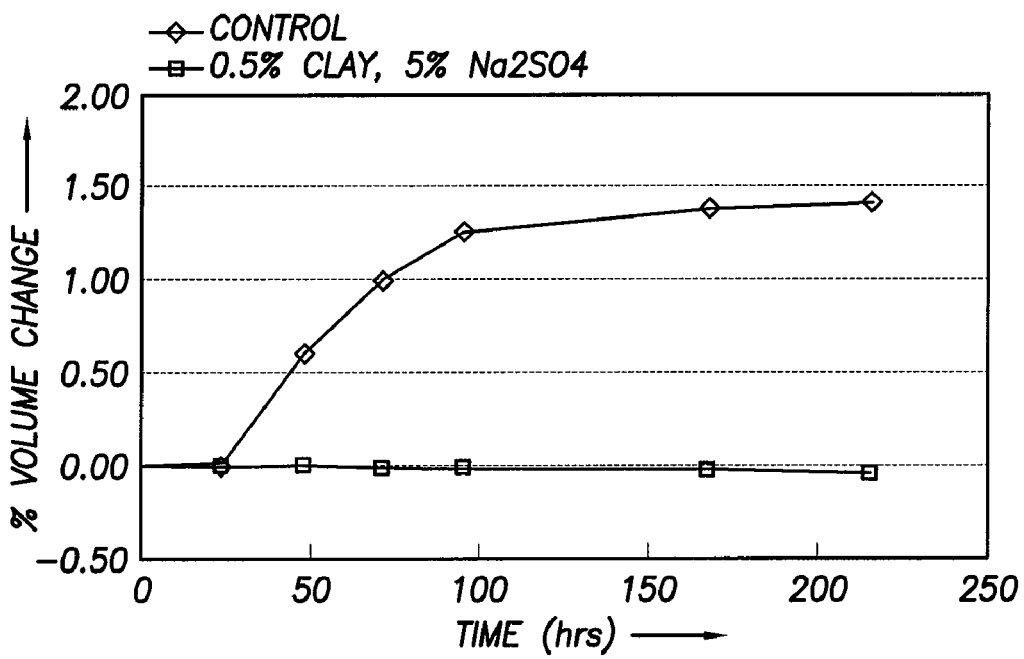
FIG. 7 illustrates the results of cement shrinkage tests performed on a variety of cement compositions, including an embodiment of a cement composition of the present invention.

The two cement samples were subjected to the cement shrinkage tests by the Ring Mold method described in Example 1 under an air pressure of 1000 psi and at a temperature of 80° F., with no water present in the curing chamber. The results of the tests are illustrated in FIG. 7. The results in FIG. 7 illustrate that the bentonite and salt combination expanded under 1000 psi pressure, though to a lesser degree than the expansion demonstrated in Example 1. For example, the expansion under 1000 psi of pressure was observed to be approximately 1.4% compared to an expansion of approximately 14% at atmospheric pressure.

Example 8

Three cement samples were prepared comprising a THERMALOCK™ blend, water, sodium sulfate, and different swellable clays, as shown in Table 8 below. A control sample, Sample 26, comprised a THERMALOCK™ blend, no swellable clay, and no sulfate salt.

TABLE 8

| Sample No. | Sodium Sulfate | Bentonite Clay | Metakaolin Clay | Laponite Clay |
|---|---|---|---|---|
| 26 | 0.0% | 0.0% | 0.0% | 0.0% |
| 27 | 5.0% | 0.5% | 0.0% | 0.0% |
| 28 | 5.0% | 0.0% | 0.5% | 0.0% |
| 29 | 5.0% | 0.0% | 0.0% | 0.5% |

Figure 8:
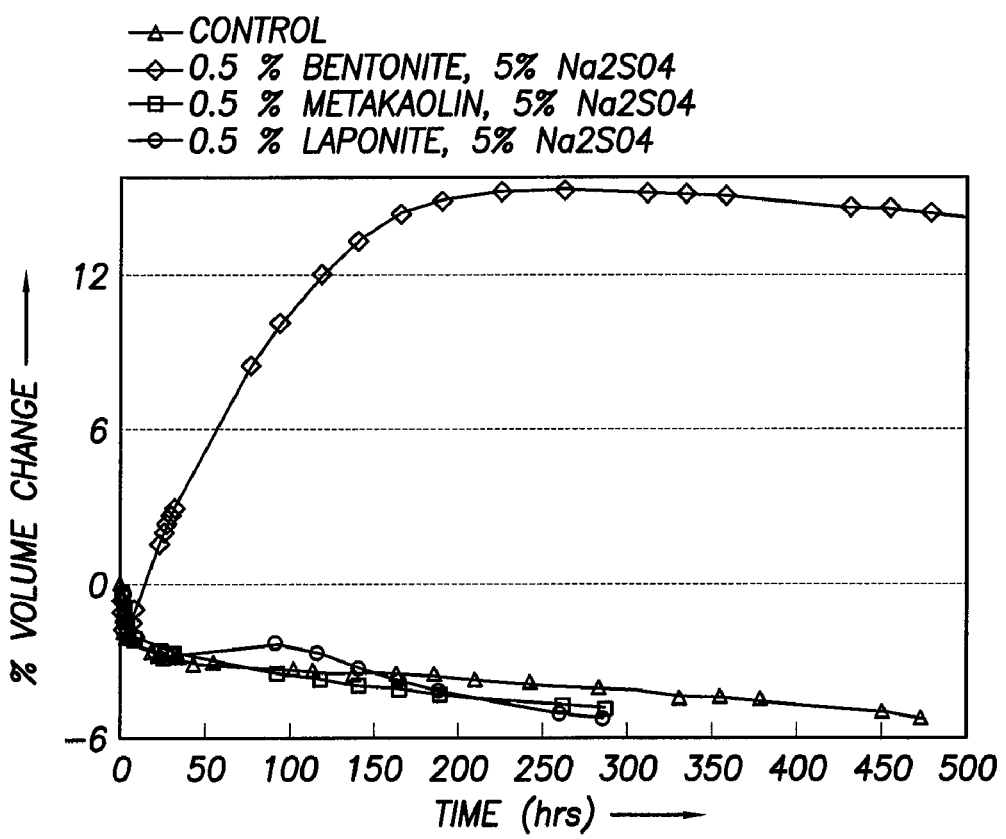
FIG. 8 illustrates the results of cement shrinkage tests performed on a variety of cement compositions, including an embodiment of a cement composition of the present invention.

The four cement samples were subjected to the cement shrinkage tests described in Example 1. The results of these tests are illustrated in FIG. 8. The results in FIG. 8 suggest that swell of the clay component may be the reason for cement expansion.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
providing a cement composition that comprises:
a high alumina cement;
a salt comprising at least one salt selected from the group consisting of: an acidic salt, a neutral salt, and a low basicity salt;
a swellable clay; and
water in an amount sufficient to form a pumpable slurry;
introducing the cement composition into a well bore that penetrates a subterranean formation; and
allowing the cement slurry to set to form a set cement composition, wherein the set cement composition has a volume increase as measured at atmospheric pressure of between about 10% and about 20% over the volume of the cement slurry.

2. The method of claim 1 wherein the high alumina cement comprises a calcium aluminate cement.

3. The method of claim 1 wherein the step of introducing the cement composition into a well bore comprises introducing the cement composition into an annulus between the well bore wall and a conduit disposed within the well bore.

4. The method of claim 1 wherein the step of introducing the cement composition into a well bore comprises introducing the cement composition in the well bore to plug a void in a larger structure that is disposed in the well bore.

5. The method of claim 1 wherein the swellable clay comprises at least one swellable clay selected from the group consisting of: beidellite, montmorillonite, bentonite, nontronite, saponite, and derivatives thereof.

6. The method of claim 1 wherein the high alumina cement comprises equal to or less than about 80% alumina by weight of the high alumina cement.

7. The method of claim 1 wherein the high alumina cement comprises equal to or greater than about 2% Fe as iron oxide by weight of the high alumina cement.

8. The method of claim 1 wherein the swellable clay is present in the cement composition in an amount in the range of from about 0.1% to about 10% by weight of the high alumina cement.

9. The method of claim 1 wherein the cement composition further comprises a polymeric phosphate salt.

10. The method of claim 1 wherein the cement composition further comprises at least on additive selected from the group consisting of: flyash, and a polyphosphate salt.

11. The method of claim 1 wherein the well bore penetrates a subterranean formation as part of a drilling operation, and wherein the well bore comprises a loss-circulation zone.

12. The method of claim 11 wherein the swellable clay comprises at least one swellable clay selected from the group consisting of: beidellite, montmorillonite, bentonite, nontronite, saponite, and derivatives thereof.

13. The method of claim 11 wherein the cement composition further comprises a polymeric phophate salt.

14. The method of claim 11 wherein the cement composition further comprises at least one additive selected from the group consisting of: a retarder, a viscosifier, a settling prevention material, an accelerator, a defoamer, a foaming surfactant, a fluid loss agent, a weighting material, a latex emulsion, a dispersant, an elastomer, a carbon fiber, a glass fiber, a metal fiber, a mineral fiber, and any combination thereof.

15. The method of claim 1 wherein the well bore is a multilateral well bore.

16. The method of claim 15 wherein the swellable clay comprises at least one swellable clay selected from the group consisting of: beidellite, montmorillonite, bentonite, nontronite, saponite, and derivatives thereof.

17. The method of claim 15 wherein the cement composition further comprises at least on additive selected from the group consisting of: flyash, and a polyphosphate salt.

18. The method of claim 15 wherein the cement composition further comprises at least one additive selected from the group consisting of: a retarder, a viscosifier, a settling prevention material, an accelerator, a defoamer, a foaming surfactant, a fluid loss agent, a weighting material, a latex emulsion, a dispersant, an elastomer, a carbon fiber, a glass fiber, a metal fiber, a mineral fiber, and any combination thereof.

19. The method of claim 15 wherein the high alumina cement comprises equal to or greater than about 2% Fe as iron oxide by weight of the high alumina cement.

20. The method of claim 15 wherein the swellable clay is present in the cement composition in an amount in the range of from about 0.1% to about 10% by weight of the high alumina cement.

* * * * *